United States Patent
Ono et al.

(10) Patent No.: US 11,541,446 B2
(45) Date of Patent: Jan. 3, 2023

(54) APPARATUS FOR MANUFACTURING FIN AND METHOD FOR MANUFACTURING FIN

(71) Applicant: Mitsubishi Electric Corporation, Tokyo (JP)

(72) Inventors: Junichi Ono, Tokyo (JP); Hiroshi Kinoshita, Tokyo (JP); Nobuaki Miyake, Tokyo (JP); Kazuyoshi Takayama, Tokyo (JP); Takuya Ogura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 221 days.

(21) Appl. No.: 16/963,370

(22) PCT Filed: Mar. 25, 2019

(86) PCT No.: PCT/JP2019/012369
§ 371 (c)(1),
(2) Date: Jul. 20, 2020

(87) PCT Pub. No.: WO2019/198471
PCT Pub. Date: Oct. 17, 2019

(65) Prior Publication Data
US 2021/0069771 A1    Mar. 11, 2021

(30) Foreign Application Priority Data
Apr. 10, 2018    (JP) ............................. JP2018-075527

(51) Int. Cl.
B21D 53/02    (2006.01)
B23P 15/26    (2006.01)
(Continued)

(52) U.S. Cl.
CPC .......... *B21D 53/022* (2013.01); *B21D 43/08* (2013.01); *B21D 53/04* (2013.01); *B23P 15/26* (2013.01)

(58) Field of Classification Search
CPC ............................... B21D 53/022; B23P 15/26
See application file for complete search history.

(56) References Cited

U.S. PATENT DOCUMENTS 2,327,103 A * 8/1943 Gude ..................... B23D 31/02
                                                            83/102
2,836,018 A * 5/1958 Key ......................... B26D 1/00
                                                            83/303
(Continued)

FOREIGN PATENT DOCUMENTS

JP    S58-110142 A    6/1983
JP    S59-092134 A    5/1984
(Continued)

OTHER PUBLICATIONS

English Machine Translation for JP2015164741(A), Moriyama et al., Published Sep. 17, 2015.*
(Continued)

*Primary Examiner* — Sarang Afzali
(74) *Attorney, Agent, or Firm* — Buchanan Ingersoll & Rooney PC

(57) ABSTRACT

A fin manufacturing method and apparatus includes: a first inter-row slit device that forms, by forming in a thin metal plate having a plurality of openings a plurality of slits extending in a longitudinal direction of the thin metal plate while leaving an uncut portion between the plurality of slits, metal strips partially coupled to each other in a transverse direction; a feed roller and a feeding device that convey, in the longitudinal direction, the metal strips in which the plurality of slits is formed by the first inter-row slit device; and a stacking device that (i) forms fins by cutting the uncut
(Continued)

portion via which the metal strips are coupled to each other, to separate the metal strips and by cutting the metal strips at regular length intervals and (ii) stacks the formed fins.

4 Claims, 9 Drawing Sheets

(51) Int. Cl.
*B21D 43/08* (2006.01)
*B21D 53/04* (2006.01)

(56) References Cited

U.S. PATENT DOCUMENTS

| | | | | |
|---|---|---|---|---|
| 3,722,251 | A * | 3/1973 | Withrow | B21D 1/02 |
| | | | | 72/302 |
| 3,839,974 | A * | 10/1974 | Freres | B21D 28/36 |
| | | | | 83/365 |
| 4,566,359 | A | 1/1986 | Miyagi et al. | |
| 5,349,841 | A * | 9/1994 | Honma | B21D 53/02 |
| | | | | 72/333 |
| 9,009,953 | B2 * | 4/2015 | Ueda | B21D 53/08 |
| | | | | 29/33 Q |
| 9,079,277 | B2 * | 7/2015 | Karasawa | B21D 53/022 |
| 9,089,935 | B2 * | 7/2015 | Karasawa | B23P 15/26 |
| 9,120,191 | B2 * | 9/2015 | Karasawa | B21D 53/022 |
| 9,192,978 | B2 * | 11/2015 | Baba | B21D 53/022 |
| 9,199,346 | B2 * | 12/2015 | Karasawa | B21D 53/022 |
| 9,259,776 | B2 * | 2/2016 | Morishita | B21D 53/022 |
| 9,816,761 | B2 * | 11/2017 | Suzuki | B21D 53/085 |
| 2006/0070726 | A1 | 4/2006 | Yoshioka et al. | |
| 2014/0053384 | A1 | 2/2014 | Karasawa et al. | |
| 2014/0060142 | A1 | 3/2014 | Karasawa et al. | |
| 2019/0106285 | A1 * | 4/2019 | Nishizawa | B65H 23/28 |

FOREIGN PATENT DOCUMENTS

| | | |
|---|---|---|
| JP | S59150633 A | 8/1984 |
| JP | 2004-205124 A | 7/2004 |
| JP | 2004-325044 A | 11/2004 |
| JP | 2014039935 A | 3/2014 |
| JP | 2014046329 A | 3/2014 |
| JP | 2015-164741 A | 9/2015 |
| JP | 2016198777 A | 12/2016 |

OTHER PUBLICATIONS

Office Action (Notice of Reasons for Refusal) dated Apr. 20, 2021, in corresponding Japanese Patent Application No. 2020-513161 and English translation of the Office Action. (13 pages).
International Search Report (PCT/ISA/210), with translation, and Written Opinion KPCT/ISA/237) dated Jun. 4, 2019, by the Japan Patent Office as the International Searching Authority for International Application No. PCT/JP2019/012369.
U.S. Appl. No. 16/954,689, filed Jun. 17, 2020.

\* cited by examiner

APPARATUS FOR MANUFACTURING FIN AND METHOD FOR MANUFACTURING FIN

TECHNICAL FIELD

The present disclosure relates to a fin manufacturing apparatus and a fin manufacturing method.

BACKGROUND ART

A heat exchanger includes a tube that serves as a path for fluid and multiple fins that are connected to the tube and improve efficiency of heat exchange. A cross-sectional shape of the tube is determined in accordance with the intended use of the tube. The fins are manufactured by processing a thin metal plate.

Patent Literature 1 discloses a fin manufacturing apparatus for manufacturing strip-shaped fins. The fin manufacturing apparatus disclosed in Patent Literature 1 includes a press device, an inter-row slit device, a cutoff device, and a guide. The press device presses a thin metal plate to form, in the thin metal plate, cutaway portions for insertion of a flattened tube. The inter-row slit device forms slits in the thin metal plate in which the cutaway portions are formed, thereby forming in the thin metal plate a plurality of strips arranged in a transverse direction, that is, arranged in a row direction. The cutoff device cuts each of the plurality of strips at regular length intervals. The guide is disposed between the inter-row slit device and the cutoff device. The guide supplies the strips that are formed by the inter-row slit device to the cutoff device in a state in which the strips are separated from one another.

Patent Literature 2 discloses a fin manufacturing apparatus for manufacturing a fin having a trapezoidal shape. The fin manufacturing apparatus disclosed in Patent Literature 2 includes: an incision forming device that forms on an elongated thin metal plate a pair of incision lines that incline with respect to a longitudinal direction of the thin metal strip and serve as leg portions of the fin having the trapezoidal shape; and a cutoff device that forms cutting lines connecting the end portions of each of the pair of incision lines, thereby forming an upper base portion and a lower base portion of the fin. The fin manufacturing apparatus disclosed in Patent Literature 2 cuts the elongated thin metal plate using these devices, thereby manufacturing the fin having the trapezoidal shape.

CITATION LIST

Patent Literature

Patent Literature 1: Unexamined Japanese Patent Application Publication No. 2014-46329
Patent Literature 2: Unexamined Japanese Patent Application Publication No. 2016-198777

SUMMARY OF INVENTION

Technical Problem

A heat exchanger sometimes includes multiple fins. For volume manufacturing of the fins, using a fin manufacturing apparatus to manufacture the fins by forming in a thin metal plate a plurality of strips arranged in a transverse direction of the thin metal plate and further processing the formed strips are conceivable.

When the fin manufacturing apparatus disclosed in Patent Literature 1 is used to manufacture the fins, each strip formed by the inter-row slit device has an elongated shape, and thus has a relatively narrow width. This leads to low rigidity of the strips. Furthermore, employing a configuration in which openings for insertion of the flattened tubes open on one lateral side of each fin leads to a comb-like structure of the strips, thereby increasing the probability that the strips become caught during conveyance. This increases the probability that the strips curve and warp during conveyance by the guide and the probability that erroneous feeding by the guide occurs, thereby increasing the probability that variance in the length occurs when the cutoff device cuts the strips at the regular length intervals. Thus, the manufacturing device disclosed in Patent Literature 1 has difficulty in manufacturing high-quality fins.

When the fin manufacturing apparatus disclosed in Patent Literature 2 is used to manufacture the fins, the incision forming device forms the pair of incision lines that serve as the leg portions of the fin having the trapezoidal shape. The fin manufacturing apparatus disclosed in Patent Literature 2 has difficulty in forming in the thin metal plate a plurality of strips arranged in a transverse direction, and thus has difficulty in forming a plurality of strips in to manufacture a plurality of fins.

The present disclosure is made in view of the above-describe circumstances, and an objective of the present disclosure is to provide a fin manufacturing apparatus and a fin manufacturing method that lower the probability of occurrence of the erroneous feeding and enable manufacturing of high-quality fins when forming in a thin metal plate a plurality of strips and manufacturing fins from the plurality of strips.

Solution to Problem

To achieve the aforementioned objective, a fin manufacturing apparatus according to the present disclosure is a fin manufacturing apparatus for manufacturing fins for a heat exchanger and includes: a slit device to form, by forming in a plate body a plurality of slits extending in a longitudinal direction of the plate body while leaving an uncut portion between the plurality of slits, strips partially coupled to each other in a transverse direction, the plate body having heat conductivity and having a plurality of openings; a conveyance device to convey, in the longitudinal direction, the plate body in which the plurality of slits is formed by the slit device; and a stack unit to (i) form fins by cutting the uncut portion via which the strips are coupled to each other, to separate the strips and by cutting the strips at regular length intervals and (ii) stack the formed fins. The slit device forms, in each fin-forming area of the strips, the uncut portion at a predetermined position on a downstream side of the corresponding fin-forming area in a conveyance direction.

Advantageous Effects of Invention

According to the present disclosure, during conveyance of the strips, the strips are in a state of partial coupling to each other in the transverse direction. This allows the strips to have higher rigidity than that a single strip has, thereby lowering the probability that the strips curve and warp during conveyance in comparison to conveyance of the single strip. Thus, stable conveyance of the strips can be achieved, and the probability of occurrence of the erroneous feeding can be lowered. As a result, the manufacturing of high-quality fins can be achieved.

DESCRIPTION OF EMBODIMENTS

Hereinafter a heat-exchanger-fin manufacturing apparatus and a heat-exchanger-fin manufacturing method according to embodiments of the present disclosure are described with reference to the drawings.

Embodiment 1

First, a heat exchanger 100 is described that includes fins 102 manufactured by a heat-exchanger-fin manufacturing apparatus and a heat-exchanger-fin manufacturing method according to the present embodiment.

Figure 1:
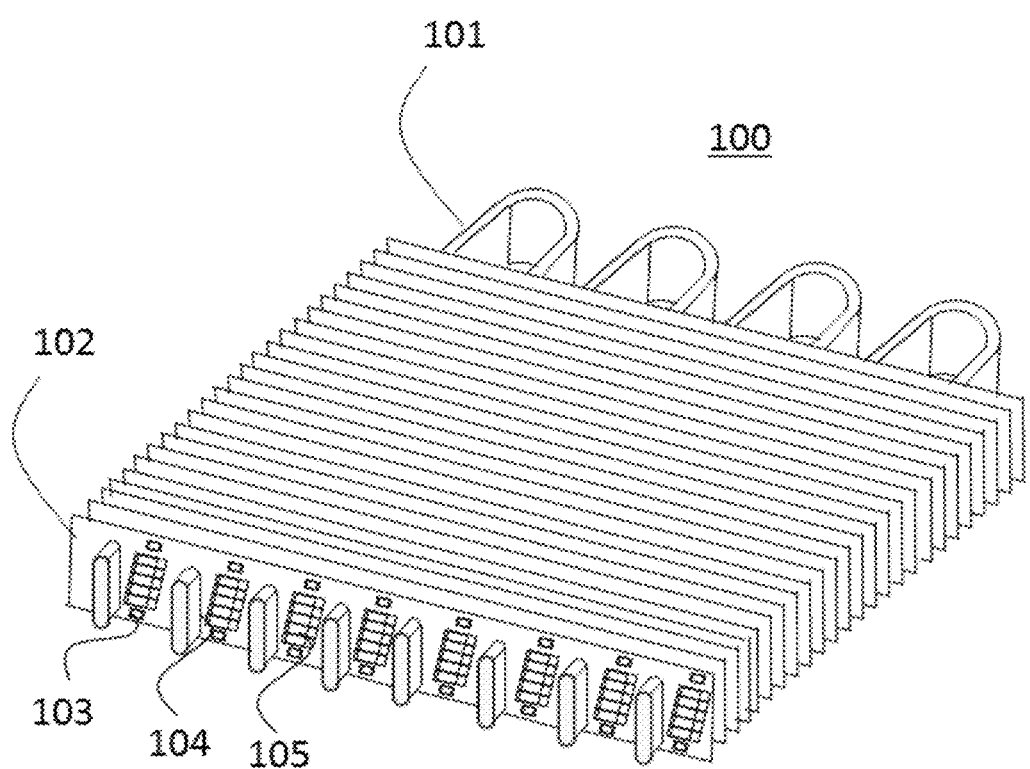
FIG. 1 is a perspective view of an example of a heat exchanger that includes fins manufactured by a fin manufacturing apparatus according to Embodiment 1 of the present disclosure.

As illustrated in FIG. 1, the heat exchanger 100 includes a plurality of fins 102 that are stacked, and flattened tubes 101 penetrating the plurality of fins 102 in the stacking direction.

Each of the flattened tubes 101 has a cross-sectional shape that is a flattened cartouche-like shape obtained by joining two circles of the same size by tangential straight lines. The flattened tube 101 is provided therein with a flow path for fluid.

The fins 102 are made from a thin plate having a rectangular parallelepiped shape. As illustrated in FIG. 1, the fins 102 are stacked with fixed intervals therebetween. A plurality of cutaway portions 104 are formed in each of the fins 102, and the flattened tubes 101 are inserted to the cutaway portions 104. Each of the cutaway portions 104 has a U-shaped trench shape corresponding to an outline of the cross-sectional shape of the flattened tube 101. Linear portions of the U-shaped trench are cut and raised.

A plurality of cut-and-raised slits 105, which is formed by cutting and raising the thin plate, is formed on each of the fins 102. Each of the cut-and-raised slits 105 has an opening that opens in the transverse direction of the fins 102, that is, opens toward the direction in which air flows through the heat exchanger 100. The cut-and-raised slits 105 split and refresh the thermal boundary layer on the surface of the fins 102, thereby improving the efficiency of heat exchange between air flowing between the fins 102 and each of the fins 102.

Openings 103 are formed, in each of the fins 102, in the vicinity of the longitudinal direction sides of the fin 102. The openings 103 are formed by cutting and raising the thin plate. The fins 102 are stacked such that cut-and-raised portions of the openings 103 contact the adjacent fin 102.

The heat exchanger 100 having the above-described configuration is manufactured by inserting the flattened tubes 101 into the cutaway portions 104 of the fins 102 stacked with spacing therebetween and brazing together the flattened tubes 101 and the fins 102. The heat exchanger 100 transfers heat of fluid flowing through the flattened tubes 101 to the fins 102 and exchanges the heat with air flowing between the fins 102.

Next, a fin manufacturing apparatus 1 and a fin manufacturing method that are for manufacturing the fin 102 are described.

Figure 2:
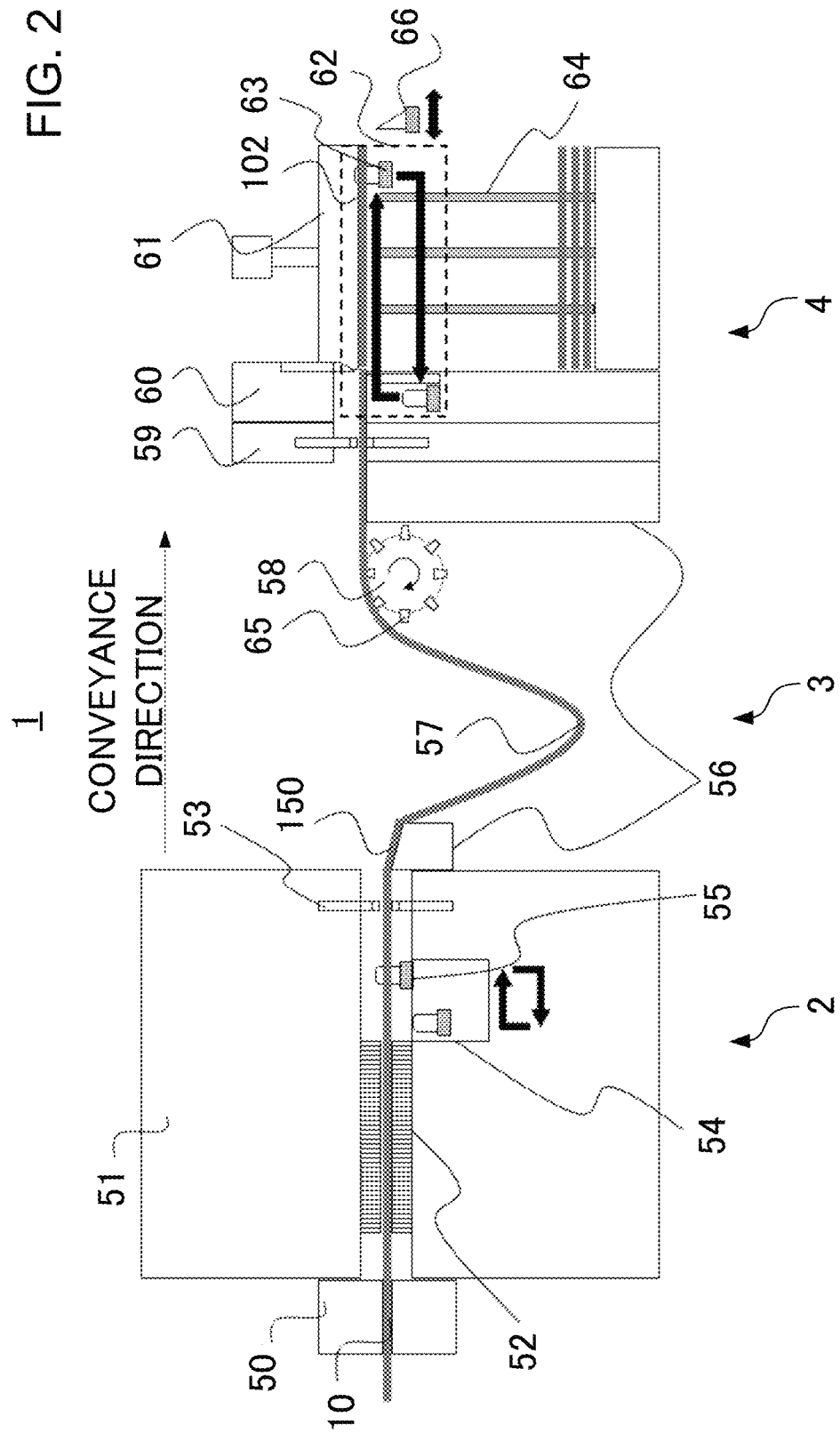
FIG. 2 is an overall view of the fin manufacturing apparatus according to Embodiment 1 of the present disclosure.

As illustrated in FIG. 2, the fin manufacturing apparatus 1 includes a progressive press unit 2 that performs press working of a thin metal plate 10 having a strip-like shape to manufacture metal strips 150, a buffer unit 3 that stores the metal strips 150 conveyed from the progressive press unit 2, and a stack unit 4 that cuts the strips 150 to form the fins 102 and stacks and retains the fins 102. The progressive press unit 2, the buffer unit 3, and the stack unit 4 are arranged, along a conveyance direction in which the thin metal plate 10 is conveyed, in the order as the progressive press unit 2, the buffer unit 3, and the stack unit 4.

First, the progressive press unit 2 is described. The progressive press unit 2 is a device that performs progressive press working of the thin metal plate 10 that is made of, for example, aluminum or steel.

The progressive press unit 2 includes a numerical control (NC) feeder 50 that supplies the thin metal plate 10 from which the fin is made, and a progressive pressing device 51 that progressively feeds the thin metal plate 10 and performs press working of the thin metal plate 10 to form the metal strips 150.

The NC feeder 50 is disposed upstream of the progressive press unit 2 in the conveyance direction of the thin metal plate 10. The NC feeder 50 intermittently feeds the thin metal plate 10 to the progressive pressing device 51. Specifically, a moving body included in the NC feeder 50 grips the thin metal plate 10 from the upper surface and the lower surface of the thin metal plate 10 and repeatedly performs the operations of gripping, moving to feed, releasing, and moving to return, thereby achieving intermittent feeding of the thin metal plate 10.

The progressive pressing device 51 includes a device for processing the supplied thin metal plate 10 into the metal strips 150, and a conveyance device. Specifically, the progressive pressing device 51 includes: a die device 52 that performs press working of the thin metal plate 10 to form two rows of metal strips 150; a first inter-row slit device 53 that forms, partially in the metal strips 150, cutting lines 107a and cutting lines 107b by which the two rows of the metal strips 150 are cut and separated into single metal strips 150 and the metal strips are cut and separated into product length strips 150a; and a feeding device 54 that conveys the metal strips 150.

The product width is a width of the fin 102 when the transverse direction of the fin 102 is defined as the "width" and the longitudinal direction of the fin 102 is defined as the "length". The "product length" described later is, according to the above-described definitions, the length of the fin 102.

Figure 3:
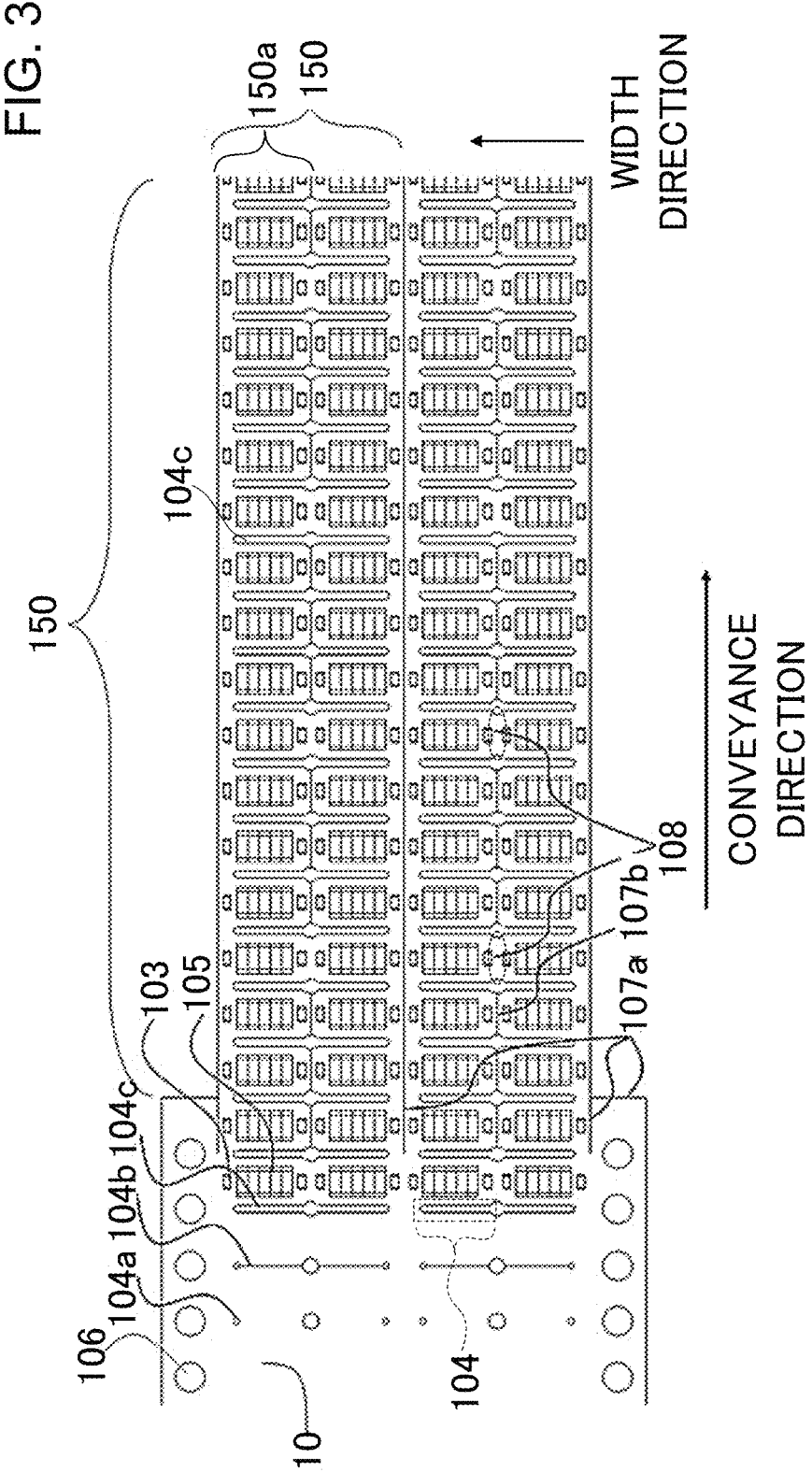
FIG. 3 is a top view of metal strips and a thin metal plate that are formed as a result of press working performed by a progressive pressing device included in the fin manufacturing apparatus according to Embodiment 1 of the present disclosure.

The die device 52 includes a die that is used in performing press working of the thin metal plate 10 to attain two rows of the metal strips 150 as illustrated in FIG. 3. The die device 52 manufactures, using the die, the metal strips 150 that each have a shape that serves as two fins 102 coupled to each other in the width direction in a state where cutaway portions 104, which render a side of each fin 102 to have a plurality of teeth and to have a comb-like shape, face to each other. The width direction is a direction that is orthogonal to, as viewed from the upper side, the conveyance direction of FIG. 3. Also, as the thin metal plate 10 is conveyed along the longitudinal direction thereof, the width direction corresponds to the transverse direction of the thin metal plate 10. As illustrated in FIG. 2, after the die device 52 performs press working of the thin metal plate 10, the thin metal plate 10 is fed to the first inter-row slit device 53.

The first inter-row slit device 53 forms slits in the thin metal plate 10, that is, forms the cutting lines 107a and the cutting lines 107b. Specifically, the first inter-row slit device 53 forms the cutting lines 107a to separate the two metal strips 150 from the thin metal plate 10. Also, the first inter-row slit device 53 forms the cutting lines 107b for processing into two product length strips 150a, that is, processing into the product length strips 150a that each has a width equal to a width of the finished fin 102. Furthermore, the first inter-row slit device 53 forms the cutting line 107b at the central portion of the metal strip 150 in the width direction, thereby separating the metal strip 150 in the width direction into two rows of a strip-like shape. To, avoid complete separation of the strip 150 into the two rows, the first inter-row slit device 53 forms uncut portions 108 on the metal strip 150 by not forming the cutting lines 107b in some portions of the strip 150.

The first inter-row slit device 53 forms, in each area that is located on the product length strips 150a and serves as the fins 102 after the processing of the metal strips 150 proceeds and the product length strips 150a are manufactured, the uncut portion 108 at a position on the most downstream side of the corresponding area in the conveyance direction. Hereinafter, each area of the product length strips 150a that is to be formed to the fins 102 is termed a "fin-forming area".

Furthermore, the first inter-row slit device 53 cuts the both sides of the metal strips 150 such that the both sides become smooth straight lines without irregularities. The metal strips 150 are, after being cut, are conveyed downstream by the feeding device 54 of FIG. 2.

As illustrated in FIG. 2, the feeding device 54 includes feed pins 55 that are insertable into pilot holes 106 of FIG. 3 formed in the thin metal plate 10. The feeding device 54 inserts the feed pins 55 into the pilot holes 106 so as to progressively feed the metal strips 150. The operation by the feeding device 54 of feeding the metal strips 150 is synchronized with both the operation by the die device 52 of processing the metal strips 150 and the operation by the first inter-row slit device 53 of forming in the thin metal plate 10 the cutting lines 107a and the cutting lines 107b. This allows the first inter-row slit device 53 to form, in each fin-forming area of the metal strips 150, the uncut portion 108 at the position on the most downstream side of the fin-forming area in the conveyance direction. The feeding device 54 feeds the metal strips 150 downstream using the feed pins 55, thereby supplying the strips 150 processed by the first inter-row slit device 53 to the buffer unit 3.

Next, the buffer unit 3 is described. The buffer unit 3 is a device that stores the metal strips 150 and adjusts, between the progressive press unit 2 and the stack unit 4, supply and discharge of the metal strips 150.

The buffer unit 3 is disposed downstream of the progressive pressing device 51. The buffer unit 3 includes a guide 56 that regulates positions of the strips 150 in the width direction, a middle buffer portion 57 that stores the metal strips 150, and a feed roller 58 that conveys the metal strips 150.

Figure 4:
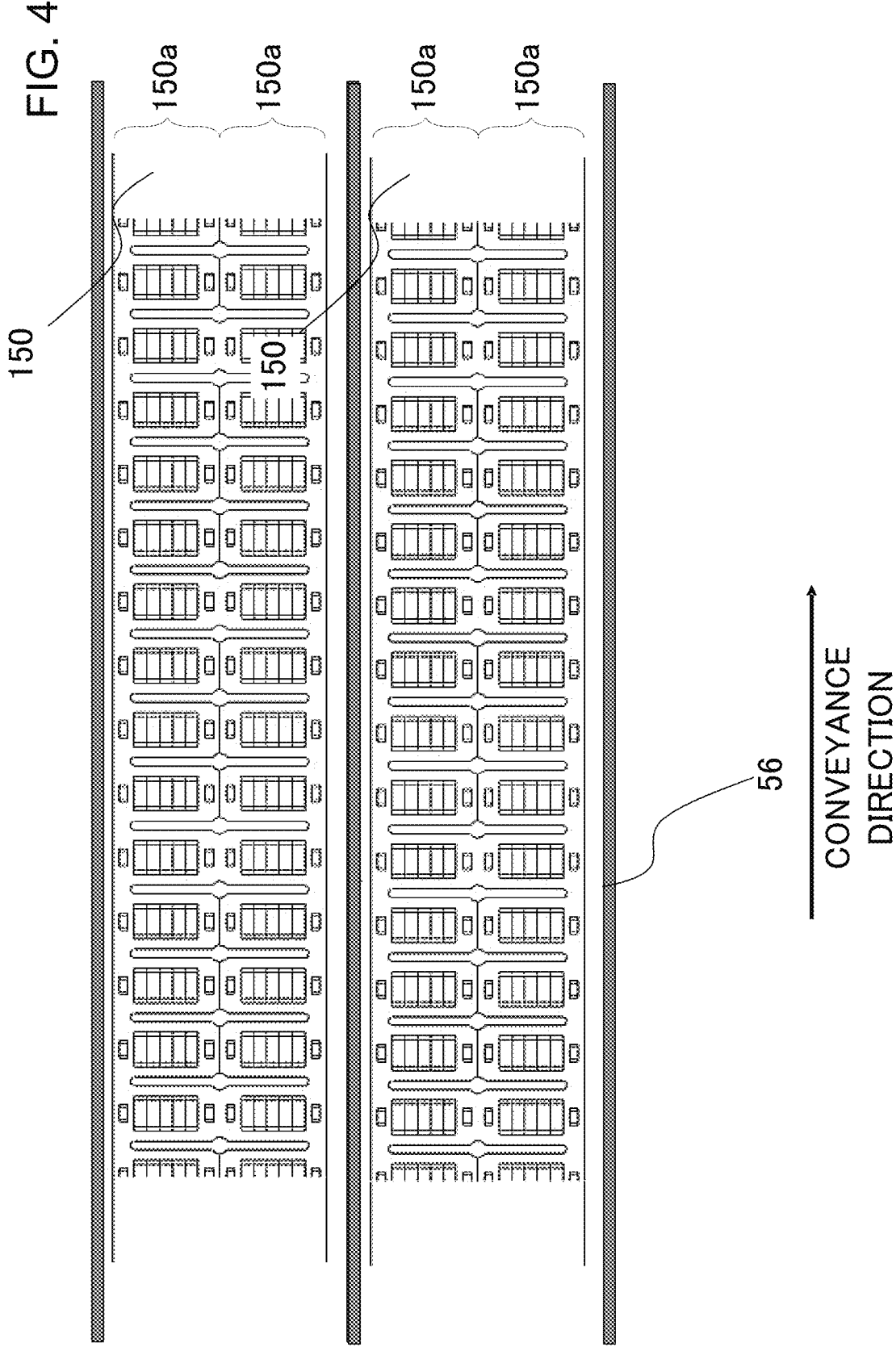
FIG. 4 is a top view of a guide included in the fin manufacturing apparatus according to Embodiment 1 of the present disclosure.

To prevent the two metal strips 150 separated by the first inter-row slit device 53 from contacting each other, the guide 56 includes walls located at both lateral sides of the two strips 150, as illustrated in FIG. 4. The walls included in the guide 56 are formed such that the inner surfaces thereof are smooth. Both sides of the metal strips 150 are also formed to be smooth and straight, and thus the the metal strips 150 tend not to interfere with or become caught by the guide 56. As a result, conveyance failures tend not to occur during conveyance in the guide 56.

The middle buffer portion 57 is, as illustrated in FIG. 2, a portion at which the metal strips 150 sag under their own weight. Due to such operation, the middle buffer portion 57 stores the metal strips 150 between the progressive press unit 2 and the stack unit 4. The middle buffer portion 57 supplies the stored metal strips 150 to the feed roller 58.

The feed roller 58 includes feed pins 65 arranged along the circumferential direction of the roller. The feed roller 58 inserts the feed pins 65 into holes formed in the metal strips 150 (for example, into elongated holes 104c) and then rotates, thereby conveying the metal strips 150. The feed roller 58 supplies the metal strips 150 to the stack unit 4 disposed downstream of the feed roller 58.

Next, the stack unit 4 is described. The stack unit 4 is a device that forms from the metal strip 150 the fins 102 and stacks the fins 102.

The stack unit 4 includes: a second inter-row slit device 59 that partially forms non-illustrated cutting lines for cutting the metal strip 150 into the product length strips 150a; a cutoff device 60 that cuts the product length strips 150a at regular length intervals to form the fins 102; a stacking device 61 that stacks and retains the fins 102; a feeding device 62 that conveys the metal strip 150; and a cutting device 66 that cuts the metal strip 150 into the product length strips 150a.

The second inter-row slit device 59 forms, in the uncut portions 108 of the metal strips 150 of FIG. 3, non-illustrated cutting lines that are continuous with the cutting lines 107b. However, the second inter-row slit device 59 does not form the cutting line in the uncut portion 108 formed on the most downstream side of the fin-forming area of the metal strip 150 in the conveyance direction.

Again with reference to FIG. 2, the cutoff device 60 is disposed downstream of the second inter-row slit device 59 and cuts the metal strip 150 in which the cutting lines are formed by the second inter-row slit device 59 to the product length of the fin 102.

The stacking device 61 is a device that stacks and retains the manufactured fins 102. The stacking device 61 includes: a suction conveyance mechanism (not illustrated) that sucks and conveys the metal strip 150 manufactured by the cutoff device 60 and the cutting device 66, sucks and conveys the manufactured fins 102, and stacks the fins 102; and stack bars 64 that retain the fins 102 stacked by the suction conveyance mechanism.

The suction conveyance mechanism sucks and holds the upper surface of the metal strip 150 being processed. After the fins 102 are manufactured by cutting the metal strip 150, the suction conveyance mechanism moves to a position above the stack bars 64 while maintaining suction of the fins 102, and stops the suction after moving to the position. The suction conveyance mechanism returns to the initial position after stopping the suction, and again sucks the metal strip 150. The suction conveyance mechanism repeatedly performs the above-described operations, thereby stacking the fins 102.

The suction conveyance mechanism inserts the stack bars 64 into the cutaway portions 104 and the openings 103 that are formed on the fins 102. The suction conveyance mechanism repeatedly performs the above-described operations, thereby inserting the stack bars 64 into the cutaway portions 104 and the openings 103 that are formed on the fins 102. The feeding device 62 feeds the metal strips 150 to the suction conveyance mechanism.

Figure 5:
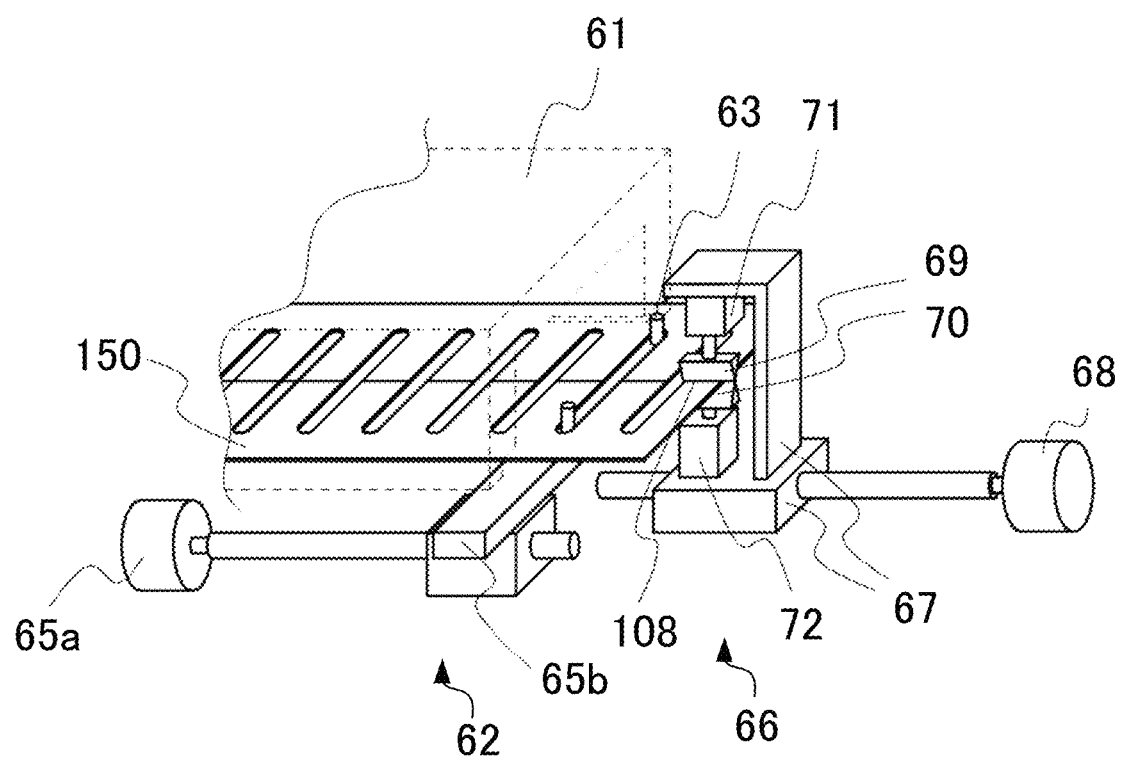
FIG. 5 is a perspective view of a cutting device included in the fin manufacturing apparatus according to Embodiment 1 of the present disclosure.

The feeding device 62 includes feed pins 63 that are movable upstream and downstream in the conveyance direction. The feed pins 63 have an outer diameter that allows insertion into holes formed on the metal strip 150, such as the elongated holes 104c. As illustrated in FIG. 5, the feed pins 63 are arranged on a base 65b. The feed pins 63 are movable between a position projecting upward from the upper surface of the base 65b and a position sinking downward into the base 65b. The metal strip 150 is placed on an upper surface of the base 65b. The base 65b is connected to a feeding mechanism 65a. The feeding mechanism 65a includes, for example, a ball screw mechanism. The feeding mechanism 65a moves the base 65b upstream and downstream of the metal strip 150 in the conveyance direction.

The feeding device 62 moves the base 65b to upstream side with the feed pins 63 in the sunken state. Then, when the base 65b reaches a position located upstream of a cutoff position at which the cutoff device 60 of FIG. 2 performs cutting, the feeding device 62 causes projection of the feed pins 63, thereby inserting the feed pins 63 into the elongated holes 104c of the strip 150. Then, the feeding device 62 moves the base 65b of FIG. 5 downstream, thereby conveying the metal strip 150 downstream. As a result, the metal strip 150 waiting upstream of cutting blades included in the cutoff device 60 is conveyed downstream. The feeding device 62 conveys the metal strip 150 to the stacking device 61, and the conveyed metal strip 150 is sucked by the non-illustrated suction conveyance mechanism of the stacking device 61.

The moving speed of the base 65b and the timings at which the feed pins 63 project and sink are synchronized with the speed and the timing of the feeding of the metal strip 150 performed by the feed pins 65 of FIG. 2.

The cutting device 66 cuts the uncut portion 108 formed on the most downstream side in the conveyance direction of the metal strip 150 sucked and conveyed by the suction conveyance mechanism, thereby separating the strip 150 into the product length strips 150a. As illustrated in FIG. 5, the cutting device 66 includes: an upper blade 69 and a lower blade 70 that cut the uncut portion 108 formed at the end portion on the downstream side of the metal strip 150; a driving mechanism 71 that moves the upper blade 69 along the vertical direction and a driving mechanism 72 that moves the lower blade 70 along the vertical direction; a base 67 that holds the driving mechanism 71 and the driving mechanism 72; and a driving mechanism 68 that moves the base 67 in the conveyance direction of the metal strip 150.

The driving mechanism 68 moves the base 67, thereby moving the upper blade 69 and the lower blade 70 between a retraction position and a position of the metal strip 150 at which the uncut portion 108 is formed. After the driving mechanism 68 moves the upper blade 69 and the lower blade 70 to the position of the metal strip 150 at which the uncut portion 108 is formed, the driving mechanism 71 and the driving mechanism 72 moves the upper blade 69 and the lower blade 70 along the vertical direction, thereby cutting the uncut portion 108 at the position of the metal strip 150 at which the uncut portion 108 is formed. After the cutting the upper blade 69 and the lower blade 70 are returned to the retraction position by the driving mechanism 68.

The thin metal plate 10 is an example of the plate body in the claims, and the guide 56 is an example of the guide in the claims. The feed roller 58 and the feeding device 62 are examples of the conveyance device in the claims, and the second inter-row slit device 59 is an example of the second slit device in the claims. The suction conveyance mechanism included in the stacking device 61 is an example of the suction portion in the claims, and the stack unit 4 is an example of the processing device in the claims. The width direction is an example of the transverse direction in the claims.

Next, steps of manufacturing the fins 102 by use of the fin manufacturing apparatus 1 are described.

The NC feeder 50 intermittently feeds the thin metal plate 10 to the progressive press unit 2. In the progressive press unit 2, the feeding device 54 included in the progressive pressing device 51 inserts the feed pins 55 into the pilot holes 106 formed by the die device 52 in the thin metal plate 10. Then, the feeding device 54 moves the feed pins 55 in synchrony with the NC feeder 50, thereby performing intermittent feeding of the thin metal plate 10.

Furthermore, in the progressive press unit 2, the die device 52 forms, in the thin metal plate 10 that is intermittently fed, the openings 103, holes 104a, incisions 104b, the elongated holes 104c, the cut-and-raised slits 105, and the pilot holes 106 that are illustrated in FIG. 3.

More specifically, the die device 52 forms a plurality of the holes 104a in a first step of press working. The holes 104a serve as end portions of the cutaway portions 104. Then, the die device 52 forms the incisions 104b, thereby interconnecting the holes 104a. Then, the die device 52 cuts and raises the vicinities of the incisions 104b to form the elongated holes 104c. Then, the die device 52 forms the cut-and-raised slits 105 and the openings 103 provided with the cut-and-raised portions.

Next, the first inter-row slit device 53 forms the cutting lines 107a and the cutting lines 107b in the thin metal plate 10 press-worked by the die device 52. The cutting lines 107a are formed to cut the thin metal plate 10 into two rows of metal strips 150, and the cutting lines 107b are formed to cut the strip 150 into two rows of the product length strips 150a. The first inter-row slit device 53 forms the cutting lines 107b discontinuously along a length direction of the metal strip 150. Specifically, the first inter-row slit device 53 forms, for example, one uncut portion 108 after forming three cutting lines 107b, as illustrated in FIG. 3. That is to say, the uncut portion 108 is formed by leaving a portion between the cutting lines 107b formed along the longitudinal direction (that is, along the conveyance direction) of the strips 150 uncut. The first inter-row slit device 53 forms, without exception, in each fin-forming area of the metal strips 150, the uncut portion 108 at a position on the most downstream side of the corresponding fin-forming area in the conveyance direction.

After processing by the progressive pressing device 51 into two rows of the metal strips 150, the thin metal plate 10 is, fed from the progressive press unit 2 to the buffer unit 3. In the buffer unit 3, the walls included in the guide 56 guide the metal strips 150 such that two rows of the metal strips 150 do not contact each other.

At this time, each of the metal strips 150 is composed of two rows of the product length strips 150a facing each other in the width direction, as described above. The cutaway portions 104 connect to each other at the central portion of these strips 150a of the product width in the width direction. Thus, cutaways are not provided at the end portions in the width direction of the metal strips 150. This allows smooth conveyance of the metal strips 150 even though the end portions of the metal strips 150 contact the walls of the guide 56, thereby preventing occurrence of failed feeding due to the guide 56.

Then the metal strips 150 sag under their own weight, and form the middle buffer portion 57. In each of the strips 150, the product length strips 150a are arranged symmetrically in the width direction. Thus the center of gravity of the metal strips 150 is located at the central portion of the strips 150 in the width direction, even after sagging under their own weight. This prevents the metal strips 150 from leaning in the width direction, thereby preventing occurrence of failed feeding of the metal strips 150 in the middle buffer portion 57.

After the metal strips 150 pass through the middle buffer portion 57, the feed pins 65 included in the feed roller 58 are inserted into holes formed in the metal strips 150 (into the elongated holes 104c, for example), and the metal strips 150 are conveyed to the stack unit 4. The feed roller 58 at this time operates to convey the metal strips 150 in synchrony with the feeding device 62 included in the stack unit 4.

The middle buffer portion 57 absorbs the differences between the feeding timings at which the NC feeder 50 and the feeding device 54 feed the metal strips 150 and the timings at which the feed roller 58 and the feeding device 62 feed the metal strips 150. Additionally, the middle buffer portion 57 absorbs the differences between the feeding amounts of the NC feeder 50 and the feeding device 54 and the feeding amounts of the feed roller 58 and the feeding device 62. Such operation of the middle buffer portion 57 prevents the occurrence of failed feeding of the metal strips 150.

Next, the metal strips 150 are conveyed to the stack unit 4. The stage of operation starting immediately after manufacturing of the fin 102 and stacking of the fins 102 on the stack bars 64 is described below. In this stage of operation, the portion on the downstream side of the metal strip 150 is cut by the cutoff device 60, and the entirety of the metal strips 150 are located upstream of the cutoff device 60.

The feeding device 62 causes projection of the feed pins 63 to insert the feed pins 63 into the elongated holes 104c of the strip 150 in the state described above. Then, the feed device 62 drives the feeding mechanism 65a to move the feed pins 63 downstream, thereby conveying the metal strip 150. During the conveyance, the rotation of the feed roller 58 and the movement of the feed pins 63 are synchronized, and the conveyance amount of the metal strips 150 is equal to the product length of the fin 102.

The second inter-row slit device 59 forms, during conveyance of the metal strip 150, non-illustrated cutting lines in the uncut portions 108. However, the second inter-row slit device 59 does not form the cutting line in the uncut portion 108 formed at the end portion of the metal strip 150 in a feeding direction.

The metal strip 150 is, after being cut by the second inter-row slit device 59, conveyed to the stacking device 61. In the stacking device 61, a suction mechanism sucks and holds the metal strip 150. After the metal strip 150 is sucked and held, the feed pins 63 descend and release the metal strip 150. After the release, the feed pins 63 moves upstream of the blades included in the cutoff device 60, to perform processing in the next cycle.

The cutting device 66 retracts to a retraction position downstream of the metal strip 150 in the conveyance direction free of interference with the stacking device 61 and the feeding device 62. The cutting device 66, after the feed pins 63 move upstream of the blades included in the cutoff device 60, moves to the position at which the uncut portion 108 formed at the end portion on the downstream side of the metal strip 150 is to cut, and cuts the uncut portion 108 formed on the most downstream side of the metal strip 150. After the uncut portion 108 is cut, the cutting device 66 moves to the retraction position.

In parallel with the cutting operation performed by the cutting device 66 or after the cutting device 66 moves to the retraction position, the cutoff device 60 cuts the metal strip 150 to the product length, thereby forming the fin 102. The suction conveyance mechanism included in the stacking device 61 and sucking and holding the fin 102 conveys the fin 102 to a position at which the stack bars 64 are provided. The stacking device 61 causes the suction conveyance mechanism to release the fin 102, thereby stacking the fins 102 and inserting the stack bars 64 into the cutaway portions 104 or the openings 103 formed in the fins 102. Then, the stacking device 61 causes the suction conveyance mechanism to return to the initial position.

According to the present embodiment, the fin manufacturing apparatus 1 conveys the metal strip 150 in the state in which the product length strips 150a are partially coupled to each other in the width direction, and cuts the metal strip 150 to the product width immediately before stacking, thereby manufacturing the fin 102. Such operation of the fin manufacturing apparatus 1 enables conveyance of the strip 150 while maintaining a highly rigid form thereof that tends not to bend, warp, or twist. Thus, the fin manufacturing apparatus 1 can achieve stable conveyance of the metal strip 150, thereby improving reliability on the stacking operation. Furthermore, in the fin manufacturing apparatus 1, the second inter-row slit device 59 is disposed outside of both the progressive pressing device 51 and the stacking device 61. This configuration allows the second inter-row slit device 59 to operate in synchrony with the operation of feeding the metal strip 150. Thus the fin manufacturing apparatus 1 can reduce load applied to the progressive pressing device 51 and improve productivity by shortening the stack operation period.

Embodiment 2

The stack unit 4 of Embodiment 2 includes a stacking device and a cutting device that are different from the stacking device 61 and the cutting device 66 of Embodiment 1.

Figure 6:
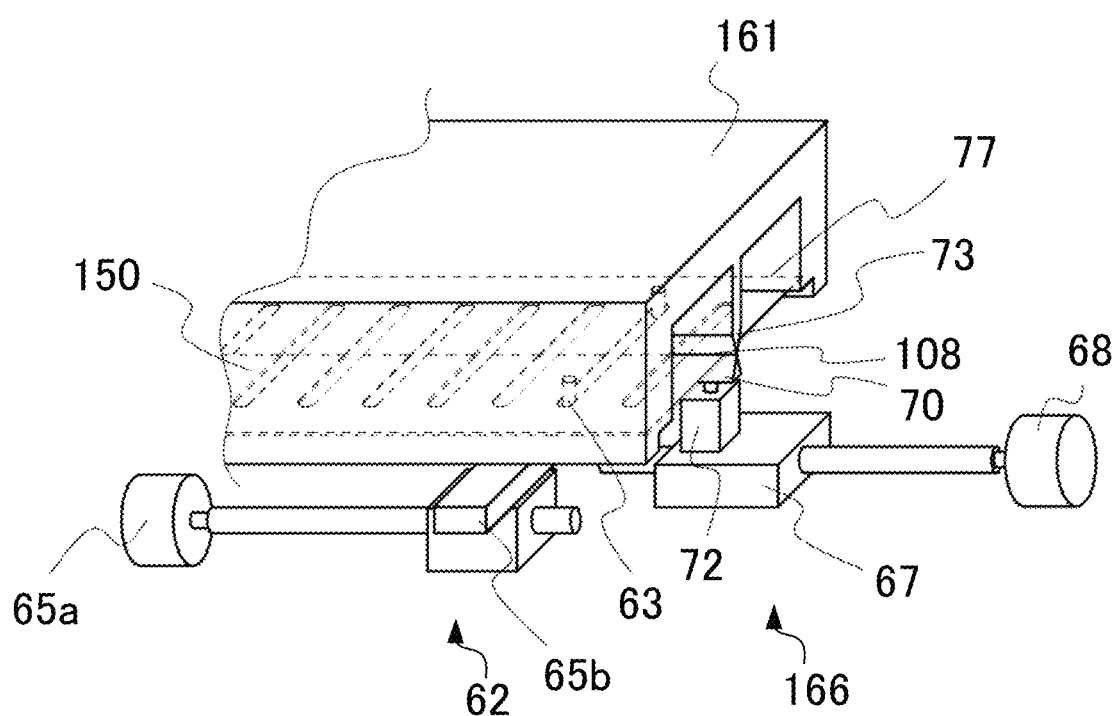
FIG. 6 is a perspective view of a cutting device included in a fin manufacturing apparatus according to Embodiment 2 of the present disclosure.

As illustrated in FIG. 6, a stacking device 161 of the present embodiment includes an upper blade 73 for cutting, after the metal strip 150 is sucked, the uncut portion 108 formed on the most downstream side of the metal strip 150, at a position corresponding to the uncut portion 108. Furthermore, the stacking device 161 includes, at the position at which the metal strip 150 is sucked, an inner wall 77 that positions the metal strip 150 in the width direction.

A cutting device 166 includes: a lower blade 70 for cutting the uncut portion 108; a driving mechanism 72 that moves the lower blade 70 along the vertical direction; a base 67 that holds the driving mechanism 72; and a driving mechanism 68 that moves the base 67 in the conveyance direction of the metal strip 150.

The cutting device 166, which includes the above-described configuration, moves from a waiting position to a position below the metal strip 150 sucked and held by the stacking device 161. In this case, the lower blade 70 is positioned below the uncut portion 108. Then the cutting device 166 operates the driving mechanism 72 to cut the uncut portion 108 using the upper blade 73 and the lower blade 70, thereby processing the metal strip 150 into the product length strips 150a.

The cutting device of Embodiment 2 does not require a driving mechanism for the upper blade, which differentiates the cutting device of Embodiment 2 from the cutting device 66 of Embodiment 1, and can achieve the cutting device with less components. Furthermore, in Embodiment 2, the inner wall 77 regulates the position of the metal strip 150 in the width direction. This improves the accuracy of the cutting position in the width direction of the metal strip 150 and also has the effect of reducing occurrences of failed manufacturing of the fin 102.

Embodiment 3

The stack unit 4 of Embodiment 3 includes a feeding device and a cutting device that are different from the feeding device 62 and the cutting device 66 of Embodiment 1.

Figure 7:
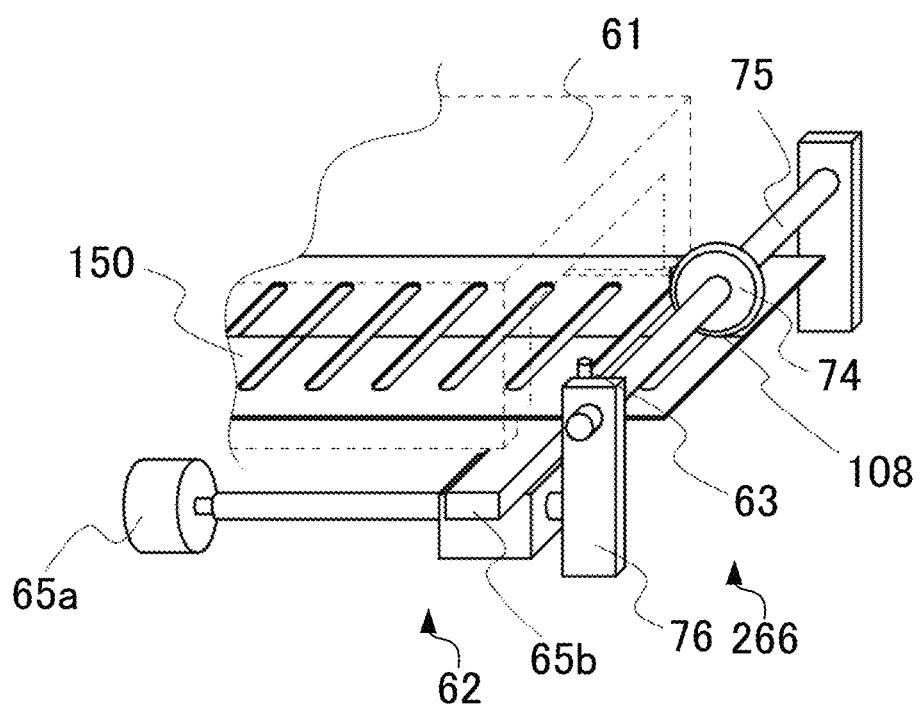
FIG. 7 is a perspective view of a cutting device included in a fin manufacturing apparatus according to Embodiment 3 of the present disclosure.

As illustrated in FIG. 7, a cutting device 266 includes: a rotary blade 74 that cuts the uncut portion 108 formed on the most downstream side of the metal strip 150; rotary shafts 75 connected through the center of the rotary blade 74; and a supporting members 76 that rotatably support the rotary shafts 75.

The feeding device 62 uses the feed pins 63 to convey the metal strip 150 to the stacking device 61. Before completion of the conveyance, the uncut portion 108 formed at the end portion on the downstream side of the metal strip 150 contacts the rotary blade 74 that is rotatably held. The feeding device 62 maintains the conveyance, thereby causing the rotary blade 74 to rotate and cut the uncut portion 108. The rotary blade 74 may be configured to rotate passively by contacting with the metal strip 150, or may be configured to rotate actively by inclusion of an actuator.

The upper surface of the base 65b that retains the feed pins 63 included in the feeding device 62 may interfere with the rotary blade 74 when the rotary blade 74 cuts the uncut portion 108. Thus to prevent occurrence of interference of the base 65b with the rotary blade 74, a concave shape is formed on the upper surface of the base 65b.

Furthermore, the cutting device 266 may employ another cutting method. Although a method of cutting the metal strip 150 by fixing the position of the rotary blade 74 and moving the metal strip 150 is described above, the position of the strip 150 may instead be fixed as described in Embodiment 1. In fixing the strip 150, the cutting device 266 may employ a method of cutting the metal strip 150 by moving the rotary blade 74 upstream.

According to Embodiment 3, a mechanism for driving the rotary blade 74 along the vertical direction may be omitted.

Thus, in Embodiment 3, the number of components can be further reduced in comparison to Embodiment 2.

Embodiment 4

The stack unit 4 of Embodiment 4 includes a cutting device that is different from the cutting device 66 of Embodiment 1.

Although not illustrated, the second inter-row slit device 59 forms, in the uncut portions 108 formed in the metal strip 150, the cutting lines in the form of perforations.

Figure 8:
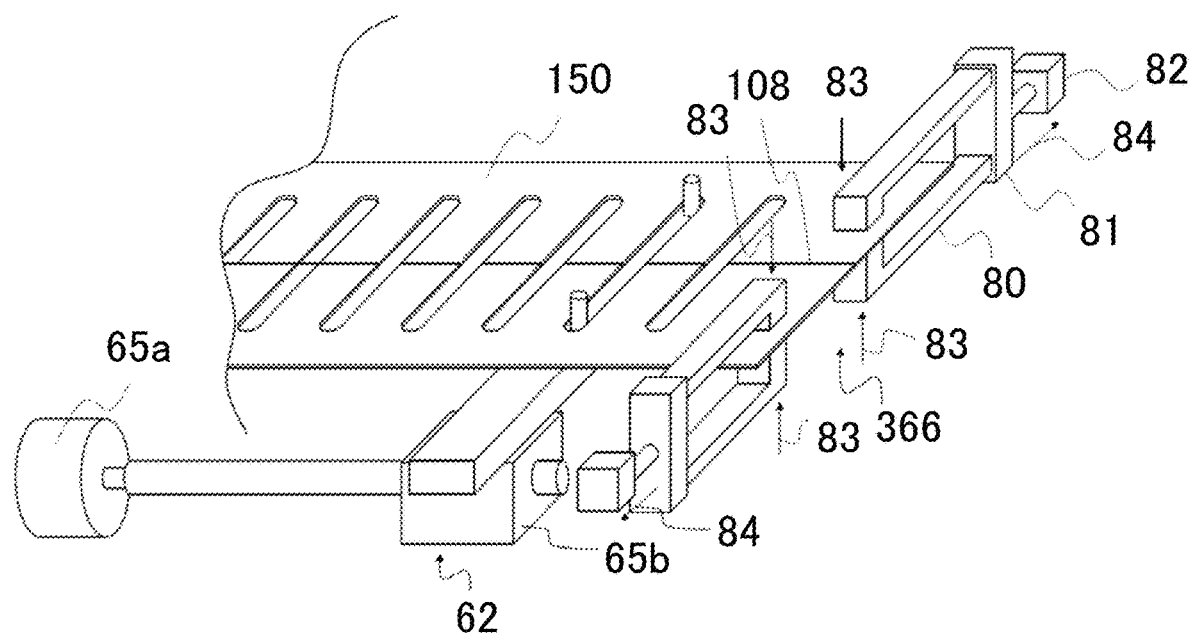
FIG. 8 is a perspective view of a cutting device included in a fin manufacturing apparatus according to Embodiment 4 of the present disclosure.

As illustrated in FIG. 8, a separating device 366 includes: a pair of grippers that each grip one side of both sides of the uncut portion 108 formed in the metal strip 150; and a driving mechanism 82 that moves each of the grippers 80 of the pair to in a direction away from the other gripper 80 and separates one row part of the metal strip 150 from the other row part.

Each of the grippers 80 includes a pair of hook-shaped holding parts that are opened and closed by a driving mechanism 81. Each of the grippers 80 grips the metal strip 150 by closing the pair of holding parts thereof to hold the metal strip 150, and stops gripping of the metal strips 150 by opening the pair of holding parts thereof.

The driving mechanism 82 moves each of the grippers 80 along the transverse direction of the metal strip 150. Specifically, the driving mechanism 82 moves the pair of grippers 80 to positions of opposition across the uncut portion 108. The driving mechanism 82, after the grippers 80 grip the metal strip 150, moves each of the grippers 80 of the pair in a direction away from the other gripper 80, thereby separating one row part of the metal strip 150 from the other row part. The driving mechanism 82, after the gripper 80 stops gripping the metal strip 150, causes the pair of grippers 80 to return to the positions of opposition across the uncut portion 108.

After the second inter-row slit device 59 forms in the uncut portions 108 the non-illustrated cutting lines in the form of the perforations, the feeding device 62 conveys the metal strip 150 in which the cutting lines in the form of the perforations are formed. The separating device 366 moves each of the grippers 80 of the pair to positions of opposition across the cutting line in the form of the perforations. The separating device 366, after completion of the conveyance of the metal strip 150, moves the pair of holding parts in a closing direction 83, thereby causing the grippers 80 to grip the metal strip 150. Each of the grippers 80 grips the corresponding row part of the metal strip 150.

Then the separating device 366 causes the driving mechanism 82 to move each of the grippers 80 in a separating direction 84. This causes each of the grippers 80 to move in the direction away from the other gripper 80 along the width direction of the metal strip 150, thereby separating one row part of two row parts of the metal strip 150 from the other row part and separating the metal strip 150 into two fins 102.

According to Embodiment 4, the separating device 366 separates the uncut portion 108 without using blades, such as the upper blade 69, the upper blade 73, the lower blade 70, and the rotary blade 74. This prevents occurrence of failed cutting due to wear of blades. Furthermore, there no need in Embodiment 4 to replace worn blades, which prevents the incurring of costs for replacing blades. As a result, the running costs of the fin manufacturing apparatus 1 can be reduced.

When the metal strip 150 is cut using blades such as the upper blade 69, the upper blade 73, the lower blade 70, and the rotary blade 74 in Embodiments 1-3, metal powder is generated by the cutting of the metal strip 150 and the wear of the blades. However, the metal strip 150 in Embodiment 4 is separated, by separating one row part of two row parts of the metal strip 150 from the other row part, into the fins 102. Thus generation of metal powder by the cutting of the metal strip 150 and the wear of the blades can be prevented in Embodiment 4. As a result, the fin 102 is less likely to contain such metal powder as a foreign matter.

Furthermore, although the second inter-row slit device 59 forms in the uncut portions 108 the cutting lines in the form of the perforations in Embodiment 4, the second inter-row slit device 59 may form cutting lines while leaving in the uncut portions 108 uncut areas extending in the width direction of the thin metal plate 10. Although the thickness direction dimension of the uncut areas depends on the thickness of the thin metal plate 10, such thickness may be half the thickness of the thin metal plate 10, for example.

Although embodiments of the present disclosure are described above, these embodiments are examples, and the scope of the present disclosure is not limited by these embodiments.

For example, the shape, arrangement and number of the uncut portions 108 are not limited to those of the above-described embodiments, and the shape, arrangement and number may be freely selected. That is to say, although the above-described embodiments describe an example of forming the uncut portion 108 on the most downstream side of each fin-forming area, the uncut portions 108 may be left in other positions. However, in view of cutting efficiency, arrangement of the uncut portion 108 on the most downstream side of each fin-forming area is desirable.

Figure 9:
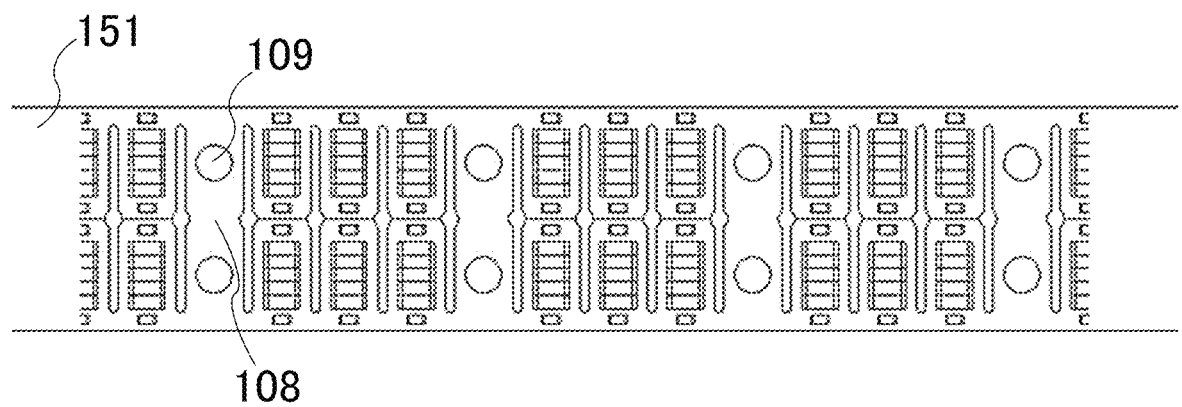
FIG. 9 is a top view of metal strips during manufacturing performed by the fin manufacturing apparatuses according to Embodiments 1-3 of the present disclosure.

The structure the fin 102 changes depending on the structure of the heat exchanger 100 to be manufactured. Thus the fin manufacturing apparatus 1 can, by modifying the die device 52 according to the needed fin 102, process the thin metal plate 10 into a metal strip 151 having the pilot holes 109 between the fins, as illustrated in FIG. 9. Furthermore, although not illustrated, the fin manufacturing apparatus 1 can form the elongated holes 104c such that the longitudinal direction thereof is inclined with respect to the feeding direction.

The cutting device 66 including the feed roller 58, the feeding device 62, and the driving mechanism included in the cutting device 66 may be configured using a motor or a combination of a motor and a ball screw, for example, to make possible a configuration that enables numerical control (NC). This allows the fin manufacturing apparatus 1 to change the length of a product to be manufactured and to adjust the speed and timing of the operation performed by each driving device.

The above-described embodiments describe examples in which two strips are partially coupled to each other via the uncut portions 108. However, in some embodiments, the uncut portions 108 may be formed such that three strips or more are arranged in the width direction and are partially coupled to the adjacent strip via the uncut portions 108. Furthermore, although the above-described embodiments describe examples of forming the fin from a metal such as aluminum or steel, the material of the fin 102 is not particularly limited to aluminum or steel and may be another material that has high thermal conductivity, such as a carbon material.

The structure of each fin 102 is not limited to the structure described in the embodiments, and may be another structure. For example, the fin 102 may have a structure, such as the structure as illustrated in FIG. 1, in which the cutaway portions 104 do not open on a lateral side thereof.

Although the above-described embodiments describe a flattened tube as an example of a tube through which fluid flows, the tube may have any cross-sectional shape that allows fluid to flow through the inside thereof. The tube may have, for example, a circular, oval or polygonal cross-sectional shape.

The first inter-row slit device 53 and the second inter-row slit device 59 may employ another cutting method. Another cutting mechanism configured to perform cutting by use of a press, a blade, and a laser, for example, may be employed in the in the first inter-row slit device 53 and the second inter-row slit device 59.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2018-75527, filed on Apr. 10, 2018, the entire disclosure of which is incorporated by reference herein.

REFERENCE SIGNS LIST

1 Fin manufacturing apparatus
2 Progressive press unit
3 Buffer unit
4 Stack unit
10 Thin metal plate
50 NC feeder
51 Progressive pressing device
52 Die device
53 First inter-row slit device
54 Feeding device
55 Feed pin
56 Guide
57 Middle buffer portion
58 Feed roller
59 Second inter-row slit device
60 Cutoff device
61 Stacking device
62 Feeding device
64 Feed pin
65 Stack bar
65 Feed pin
65a Feeding mechanism
65b Base
66 Cutting device
67 Base
68 Driving mechanism
69 Upper blade
70 Lower blade
71 Driving mechanism
72 Driving mechanism
73 Upper blade
74 Rotary blade
75 Rotary shaft
76 Supporting member
77 Inner wall
80 Gripper
81 Driving mechanism 82 Driving mechanism
83 Closing direction
84 Separating direction
100 Heat exchanger
101 Flattened tube
102 Fin
103 Opening
104 Cutaway portion
104a Hole
104b Incision
104c Elongated hole
105 Cut-and-raised slit
106 Pilot hole
107a Cutting line
107b Cutting line
108 Uncut portion
109 Pilot hole
150 Metal strip
150a Product length strip
151 Metal strip
161 Stacking device
166 Cutting device
266 Cutting device
366 Separating device

The invention claimed is:

1. A fin manufacturing method for manufacturing fins for a heat exchanger, comprising:
　a conveyance step of conveying strips that are partially coupled to each other in a transverse direction to a processing position in a state where uncut portions are left in fin-forming areas of the strips, the uncut portions each being left in a corresponding fin-forming area of the fin-forming areas;
　a fin forming step of forming fins at the processing position by cutting each of the uncut portions in a longitudinal direction to separate the strips from each other and cutting the strips to a predetermined length; and
　a stacking step of stacking the formed fins.

2. The fin manufacturing method according to claim 1, further comprising:
　a buffering step of, before the conveyance step, buffering the strips by causing the strips to sag by a weight of the strips.

3. The fin manufacturing method according to claim 1, wherein
　the conveyance step includes holding the strips by sucking the strips and conveying the held strips to the processing position,
　the fin forming step includes forming the fin by cutting the conveyed strips at the processing position while maintaining the holding of the strips, and
　the stacking step includes conveying the formed fin to a specific position located downstream of the processing position and stopping the suction of the fin at the specific position, thereby releasing and stacking the fin.

4. A method for manufacturing a heat exchanger, comprising:
　an assembling step of attaching and brazing, to a tube, the fin manufactured using the fin manufacturing method according to claim 1.

* * * * *